(12) United States Patent
Shirasaki et al.

(10) Patent No.: US 9,606,492 B2
(45) Date of Patent: Mar. 28, 2017

(54) SHEET FOLDING DEVICE, IMAGE FORMING APPARATUS AND GEAR COUPLING MECHANISM

(71) Applicant: KYOCERA Document Solutions Inc., Osaka-shi, Osaka (JP)

(72) Inventors: Seiichi Shirasaki, Osaka (JP); Yasunori Ueno, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 15/157,299

(22) Filed: May 17, 2016

(65) Prior Publication Data

US 2016/0363900 A1 Dec. 15, 2016

(30) Foreign Application Priority Data

Jun. 12, 2015 (JP) ................. 2015-119068

(51) Int. Cl.
*B65H 45/04* (2006.01)
*G03G 15/00* (2006.01)
(Continued)

(52) U.S. Cl.
CPC ......... *G03G 15/6555* (2013.01); *B65H 45/04* (2013.01); *B65H 45/142* (2013.01); *B65H 45/16* (2013.01); *B65H 45/18* (2013.01); *B65H 2301/452* (2013.01); *B65H 2403/42* (2013.01); *B65H 2403/73* (2013.01); *B65H 2404/1316* (2013.01); *B65H 2404/147* (2013.01); *B65H 2801/27* (2013.01)

(58) Field of Classification Search
CPC ...... B65H 45/04; B65H 45/142; B65H 45/16; B65H 45/18; B65G 39/02; B65G 39/04; B65G 39/06; B65G 39/07
USPC ................ 270/32, 39.08, 45; 493/444, 445; 399/407
See application file for complete search history.

(56) References Cited

U.S. PATENT DOCUMENTS 1,273,952 A * 7/1918 Tibbetts ................. F16D 41/22
192/113.1
2,060,376 A * 11/1936 Jex ......................... F16D 41/06
188/30
(Continued)

FOREIGN PATENT DOCUMENTS

JP 2008247534 A 10/2008

*Primary Examiner* — Patrick Mackey
(74) *Attorney, Agent, or Firm* — Alleman Hall McCoy Russell & Tuttle LLP

(57) ABSTRACT

A sheet folding device includes two rollers, a blade, two parallel pins, and two gears. The first and second parallel pins are passed through first and second pin through-holes penetrating through first and second shaft portions in a direction perpendicular to a longitudinal direction of the shaft portions. The first and second gears have first and second shaft through-holes through which the first and second shaft portions are passed, and first and second grooves in which the first and second parallel pins are inserted, respectively. Projection portions formed on inner side wall of the second groove and projecting from both sides of the second shaft portion cause the second parallel pin to closely contact a side wall that is, in the second groove, opposite to the projection portions, and cause the second parallel pin to closely contact a portion of the second pin through-hole.

6 Claims, 12 Drawing Sheets

(51) Int. Cl.
*B65H 45/14* (2006.01)
*B65H 45/18* (2006.01)
*B65H 45/16* (2006.01)

(56) References Cited

U.S. PATENT DOCUMENTS

| | | | | |
|---|---|---|---|---|
| 3,566,497 | A * | 3/1971 | Hamlen et al. | B65G 39/09 198/842 |
| 5,117,970 | A * | 6/1992 | Gibbs | B65G 39/07 198/808 |
| 5,398,618 | A * | 3/1995 | McMullen | B61B 10/022 105/148 |
| 6,527,097 | B2 * | 3/2003 | Dreyer | B65G 43/06 193/35 A |
| 7,771,333 | B2 * | 8/2010 | Spiess | B65G 39/12 193/37 |
| 8,430,801 | B2 * | 4/2013 | Dallum | B65G 39/02 193/37 |
| 9,221,609 | B2 * | 12/2015 | Specht | B65G 39/02 |
| 2008/0182740 | A1 * | 7/2008 | Fukasawa | B65H 45/18 493/405 |
| 2010/0320672 | A1 | 12/2010 | Fukasawa et al. | |

* cited by examiner

SHEET FOLDING DEVICE, IMAGE FORMING APPARATUS AND GEAR COUPLING MECHANISM

INCORPORATION BY REFERENCE

This application is based upon and claims the benefit of priority from the corresponding Japanese Patent Application No. 2015-119068 filed on Jun. 12, 2015, the entire contents of which are incorporated herein by reference.

BACKGROUND

The present disclosure relates to a sheet folding device, an image forming apparatus and a gear coupling mechanism.

There is generally known a post-processing device that can perform a sheet folding process. In the sheet folding process, a sheet member is folded. The post-processing device includes a pair of rollers and a plate-like blade for the sheet folding process.

The pair of rollers rotate in the state where a nip portion is formed by outer circumferential surfaces thereof contacting each other. The blade strikes the sheet member toward the nip portion, thereby the sheet member is folded in two and inserted in the nip portion. This allows the sheet members to be conveyed in the state of being folded by the nip portion.

In addition, if the pair of rollers have different peripheral speeds, the sheet members, after passing through the nip portion, are conveyed along a path that is deviated toward a roller having a lower peripheral speed.

The pair of rollers for the sheet folding process receive a driving force via gears respectively attached to shaft portions of the rollers. In addition, the gears of the pair of rollers are driven by one motor and rotate in conjunction with each other. As a result, the pair of rollers also rotate in conjunction with each other.

SUMMARY

A sheet folding device according to an aspect of the present disclosure includes a first roller and a second roller, a blade, a first parallel pin, a first gear, a second parallel pin, and a second gear. The first roller and the second roller are configured to rotate in a state where outer circumferential surfaces thereof contact each other. The blade is a plate-like member configured to strike a sheet member toward a nip portion between the first roller and the second roller. The first parallel pin is passed through a first pin through-hole that penetrates through a first shaft portion in a direction perpendicular to a longitudinal direction of the first shaft portion, the first shaft portion being a rotation shaft of the first roller. The first gear has a first shaft through-hole and a first groove. The first shaft portion is passed through the first shaft through-hole. The first parallel pin passed through the first shaft portion is inserted in the first groove. The second parallel pin is passed through a second pin through-hole that penetrates through a second shaft portion in a direction perpendicular to a longitudinal direction of the second shaft portion, the second shaft portion being a rotation shaft of the second roller. The second gear has a second shaft through-hole and a second groove. The second shaft portion is passed through the second shaft through-hole. The second parallel pin passed through the second shaft portion is inserted in the second groove. The blade strikes the sheet member such that the sheet member is folded in two and inserted in the nip portion. The first gear and the second gear rotate in conjunction with each other. The first roller rotates at a higher peripheral speed than the second roller. Projection portions are formed on a side wall which is one of opposite inner side walls of the second groove, in such a way as to project from both sides of the second shaft portion toward the second parallel pin. The projection portions cause the second parallel pin to closely contact a side wall that is, in the second groove, opposite to the side wall on which the projection portions are formed, and cause the second parallel pin to closely contact a portion of the second pin through-hole that is on an opposite side with respect to the projection portions.

An image forming apparatus according to another aspect of the present disclosure includes an image forming portion configured to form an image on a sheet member, and the sheet folding device according to the aspect of the present disclosure.

A gear coupling mechanism according to a further aspect of the present disclosure includes a rotation shaft, a parallel pin, and a gear. The parallel pin is passed through a pin through-hole that penetrates through the rotation shaft in a direction perpendicular to a longitudinal direction of the rotation shaft. The gear has a shaft through-hole and a groove. The rotation shaft is passed through the shaft through-hole. The parallel pin passed through the rotation shaft is inserted in the groove. Projection portions are formed on a side wall which is one of opposite inner side walls of the groove, in such a way as to project from both sides of the rotation shaft toward the parallel pin. The projection portions cause the parallel pin to closely contact a side wall that is, in the groove, opposite to the side wall on which the projection portions are formed, and cause the parallel pin to closely contact a portion of the pin through-hole that is on an opposite side with respect to the projection portions.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the attached drawings. It should be noted that the following embodiment is an example of a specific embodiment of the present disclosure and should not limit the technical scope of the present disclosure.

[Configuration of Image Forming Apparatus 10]

Figure 1:
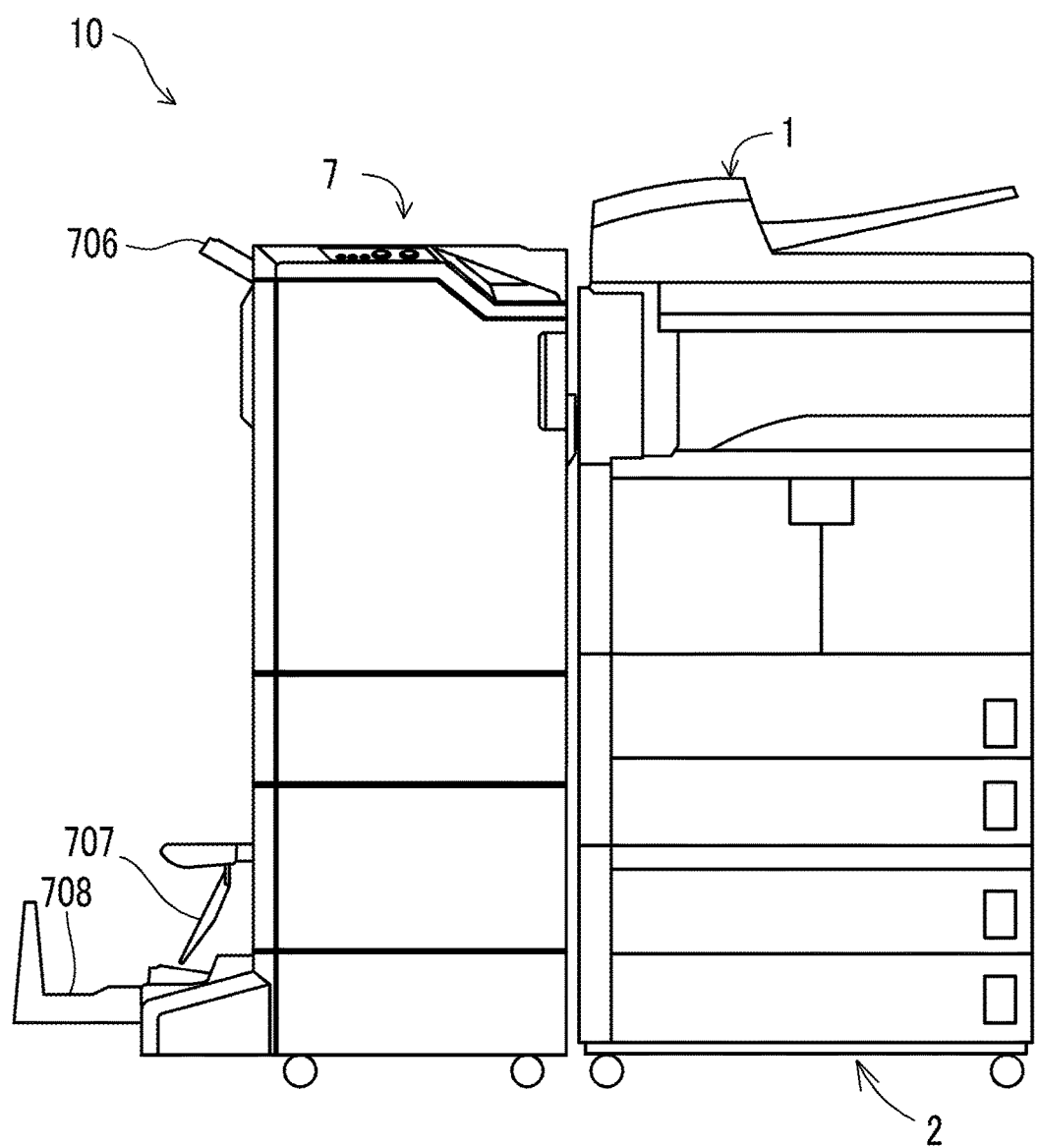
FIG. 1 is a schematic diagram showing an outer appearance of an image forming apparatus according to the embodiment.

First, a description is given of an outlined configuration of an image forming apparatus 10 according to the embodiment with reference to FIG. 1. As shown in FIG. 1, the image forming apparatus 10 includes a main body portion 2, a scanner 1, and a post-processing device 7.

The image forming apparatus 10 shown in FIG. 1 is a multifunction peripheral. The image forming apparatus 10 may be a printer, a copier, or a facsimile apparatus. The multifunction peripheral has a plurality of functions such as functions of a printer and a copier.

[Scanner 1 and Main Body Portion 2]

Figure 2:
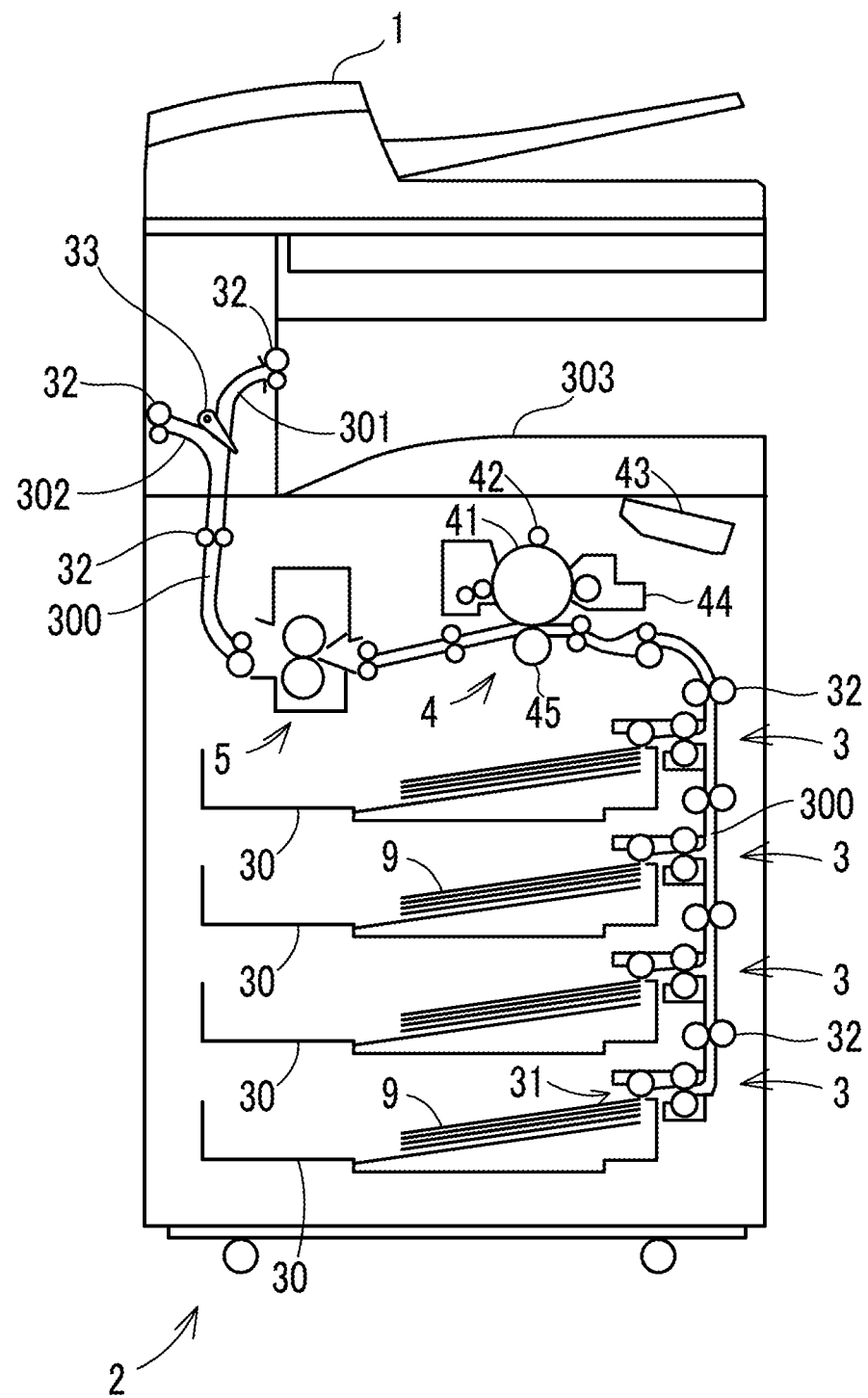
FIG. 2 is a diagram showing a configuration of a main body portion of the image forming apparatus according to the embodiment.

Next, configurations of the scanner 1 and the main body portion 2 are described with reference to FIG. 2. The scanner 1 is a device that reads an image from a document sheet. When the image forming apparatus 10 executes a copy process, the main body portion 2 forms an image on a sheet member 9 based on image data of the document sheet, the image data being output from the scanner 1.

The main body portion 2 performs an electrophotographic image formation. The main body portion 2 includes a sheet conveying portion 3, an image forming portion 4, and a fixing portion 5. It is noted that the main body portion 2 may perform an image formation by a method other than the electrophotography, such as an ink jet method.

The sheet conveying portion 3 includes a sheet receiving portion 30, a sheet feed portion 31, a conveyance roller 32, and a path switching mechanism 33. A plurality of sheet members 9 are stored in the sheet receiving portion 30 in a stacked state. It is noted that the sheet member 9 is a sheet-like image formation medium such as a sheet of paper, a sheet of coated paper, a postcard, an envelope, or an OHP sheet. The sheet feed portion 31 feeds a sheet member 9 from the sheet receiving portion 30 toward a sheet conveyance path 300.

The conveyance roller 32 conveys the sheet member 9 fed from the sheet feed portion 31, toward the image forming portion 4. Furthermore, the conveyance roller 32 conveys the sheet member 9, after an image is formed thereon, from the sheet conveyance path 300 onto a discharge tray 303 or to the post-processing device 7.

The path switching mechanism 33 selectively switches between two conveyance paths along which the sheet member 9 with the image formed thereon is to be conveyed. The two conveyance paths are a path from the sheet conveyance path 300 to the discharge tray 303, and a path from the sheet conveyance path 300 to the post-processing device 7.

The image forming portion 4 forms an image on a surface of the sheet member 9 that is moving in the sheet conveyance path 300. In the image forming portion 4, a charging portion 42 uniformly charges the surface of a rotating photoconductor 41. Furthermore, an optical scanning portion 43 writes an electrostatic latent image on the surface of the photoconductor 41 by scanning the surface with a laser beam. A developing portion 44 develops the electrostatic latent image by supplying developer to the photoconductor 41.

Furthermore, in the image forming portion 4, a transfer portion 45 transfers the image of the developer formed on the surface of the photoconductor 41 to the sheet member 9 that is moving along the sheet conveyance path 300.

In the fixing portion 5, the sheet member 9 with an image formed thereon is nipped between a pressure roller and a heating roller containing a heater and is fed to a downstream step. In this operation, the fixing portion 5 heats the image of the developer on the sheet member 9 and fixes the image to the sheet member 9.

[Post-Processing Device 7]

Figure 3:
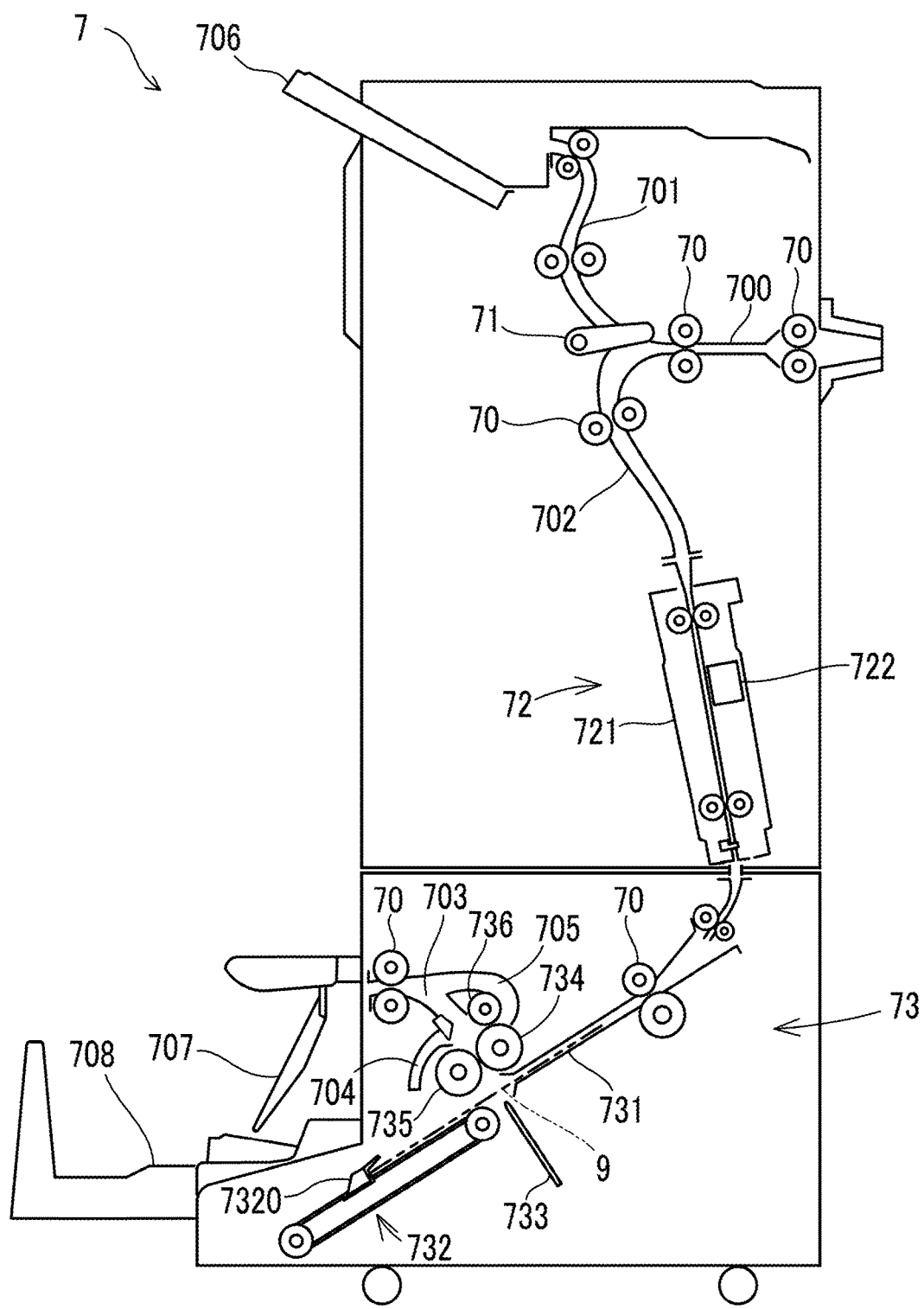
FIG. 3 is a diagram showing a configuration of a post-processing device included in the image forming apparatus according to the embodiment.

Next, the configuration of the post-processing device 7 is described with reference to FIG. 3. The post-processing device 7 performs sheet processing on the sheet member 9 conveyed from the main body portion 2. The sheet processing includes processes to be performed on the sheet member 9 such as a sheet folding process. In the example shown in FIG. 3, the post-processing device 7 also has a function to perform a stapling process.

It is noted that the post-processing device 7 may include a mechanism for conveying a sheet member 9 set in a tray (not shown) to a position where the sheet processing is to be performed. In that case, the post-processing device 7 can perform the sheet processing by itself, without cooperating with the main body portion 2.

The post-processing device 7 includes a conveyance roller 70, a path switching mechanism 71, a stapling device 72, a sheet folding device 73, a first discharge tray 706, a second discharge tray 708, and a sheet pressing portion 707.

In the post-processing device 7, an inlet conveyance path 700, a first conveyance path 701, and a second conveyance path 702 are formed to convey the sheet member 9. Furthermore, an outlet conveyance path 703, a dead-end conveyance path 704, and a bypass conveyance path 705 are formed in the downstream of the second conveyance path 702 in the post-processing device 7.

The conveyance roller 70 conveys the sheet member 9 along the inlet conveyance path 700, the first conveyance path 701, and the second conveyance path 702. The sheet member 9 sent from the main body portion 2 to the post-processing device 7 enters the inlet conveyance path 700.

The path switching mechanism 71 selectively switches between two conveyance paths along which the sheet member 9 is to be conveyed after being conveyed along the inlet conveyance path 700. Of the two conveyance paths, one is the first conveyance path 701 and the other is the second conveyance path 702. The sheet member 9 conveyed along the first conveyance path 701 is directly discharged to the first discharge tray 706 by the conveyance roller 70.

The stapling device 72 is provided in the second conveyance path 702. The stapling device 72 includes a stack tray 721 and a stapling portion 722. The stack tray 721 stores a bundle of sheet members 9 in the state of being aligned and positioned with respect to the stapling portion 722.

The stapling portion 722 performs a stapling process to staple the bundle of sheet members 9 stored in the stack tray 721. When the sheet folding process is not performed to the sheet members 9, the stapled bundle of sheet members 9 is conveyed by the conveyance roller 70 along the second conveyance path 702 in a reverse direction to the first conveyance path 701.

On the other hand, when the sheet folding process is performed to the sheet members 9, the stapled bundle of sheet members 9 is conveyed by the conveyance roller 70 to the sheet folding device 73 that is on the downstream side.

[Outlined Configuration of Sheet Folding Device 73]

Figure 4:
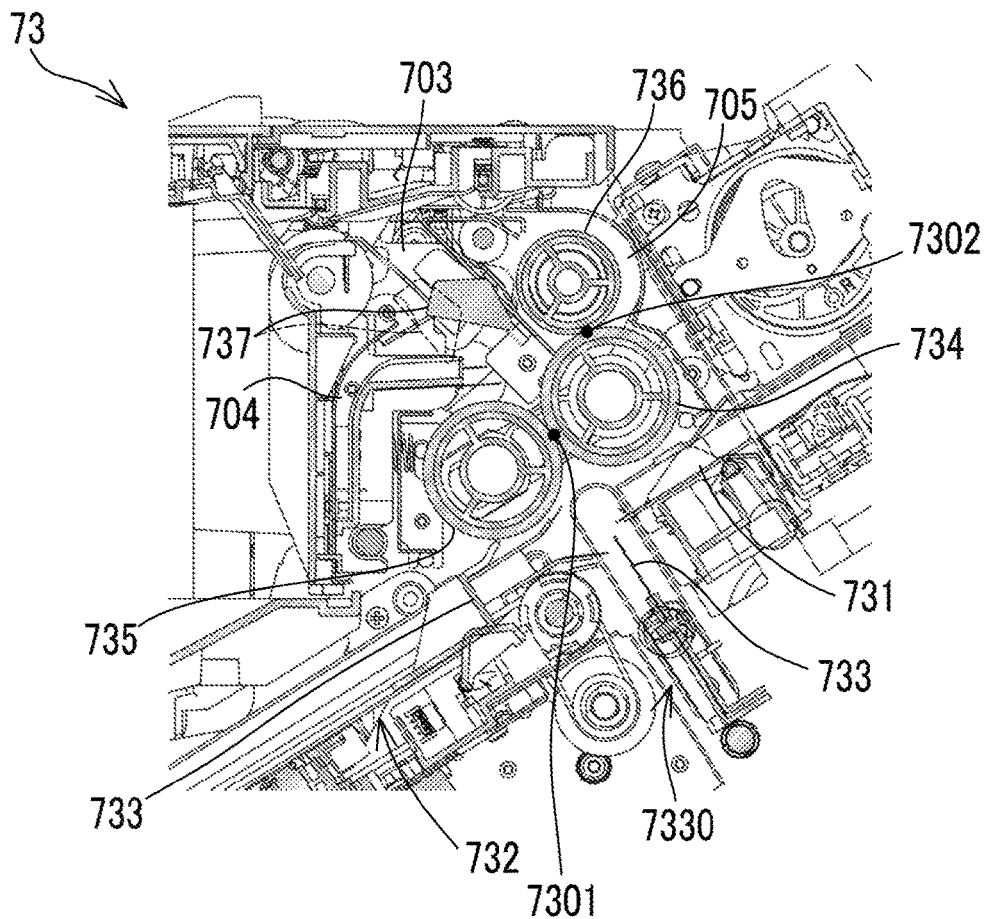
FIG. 4 is a cross-sectional view of a sheet folding device included in the post-processing device.

In the following, a description is given of an outlined configuration of the sheet folding device 73 with reference to FIG. 3 to FIG. 5. The sheet folding device 73 includes an inclined sheet supporting portion 731, a movable sheet supporting portion 732, a blade 733, a first roller 734, and a second roller 735. Furthermore, the sheet folding device 73 of the present embodiment includes a third roller 736.

The first roller 734, the second roller 735, and the third roller 736 are sheet folding rollers that fold, by nipping, one or more sheet members 9. As a result, the sheet folding device 73 can fold one or more sheet members 9 after images are formed thereon.

The first roller 734 and the second roller 735 rotate in the state where their outer circumferential surfaces contact each other. Similarly, the first roller 734 and the third roller 736 rotate in the state where their outer circumferential surfaces contact each other.

In the following description, a portion between the first roller 734 and the second roller 735, namely, a portion where the outer circumferential surfaces of the first roller 734 and the second roller 735 contact each other is referred to as a first nip portion 7301. In addition, a portion between the first roller 734 and the third roller 736, namely, a portion where the outer circumferential surfaces of the first roller 734 and the third roller 736 contact each other is referred to as a second nip portion 7302.

The inclined sheet supporting portion 731 supports a sheet member 9 sent via the second conveyance path 702, in the state where the sheet member 9 is inclined. The movable sheet supporting portion 732 includes a lower end supporting portion 7320 configured to support the lower end of the sheet member 9 that is supported by the inclined sheet supporting portion 731 in the inclined state.

The movable sheet supporting portion 732 includes a mechanism that moves the lower end supporting portion 7320 along a surface of the inclined sheet supporting portion 731 that supports the inclined sheet member 9. When the lower end supporting portion 7320 changes in position, the sheet member 9 supported by the inclined sheet supporting portion 731 changes in position.

The blade 733 is a plate-like member made of a metal such as iron or stainless steel. With an operation of a displacement mechanism 7330, the blade 733 is displaced to strike the sheet member 9 supported by the inclined sheet supporting portion 731, toward the first nip portion 7301. The displacement mechanism 7330 causes the blade 733 to be reciprocally displaced between a position where it is nipped in the first nip portion 7301 and a position where it is away from the first nip portion 7301.

The first roller 734 and the second roller 735 rotate in conjunction with each other in opposite directions. As a result, in the first nip portion 7301, the outer circumferential surfaces of the first roller 734 and the second roller 735 move in the same direction.

The blade 733 strikes the sheet member 9 at a portion between the front end and rear end thereof toward the first nip portion 7301 while the sheet member 9 is supported by the inclined sheet supporting portion 731. This allows the sheet member 9 to be folded in two and inserted into the first nip portion 7301. The sheet member 9 then passes through the first nip portion 7301 in the folded state.

The sheet member 9 folded by the sheet folding device 73 is sent to the outlet conveyance path 703 and then discharged to the second discharge tray 708 by the conveyance roller 70.

The sheet pressing portion 707 is supported in the state of hanging down from an upper portion of the exit of the outlet conveyance path 703. The sheet pressing portion 707 is configured to press, from above, the sheet member 9 discharged from the outlet conveyance path 703. The sheet pressing portion 707 prevents the sheet member 9 discharged from the outlet conveyance path 703 from interfering with the next discharging of a sheet member 9.

Figure 5:
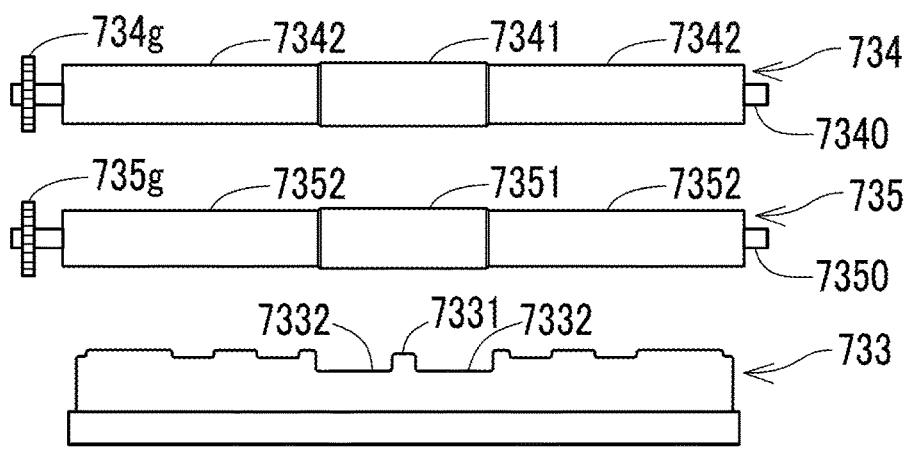
FIG. 5 is a top view of a first roller, a second roller, and a blade included in the sheet folding device.

FIG. 5 is a diagram showing the first roller 734, the second roller 735, and the blade 733 individually.

As shown in FIG. 5, the first roller 734 includes a large diameter portion 7341 at a center thereof in the longitudical direction, wherein the large diameter portion 7341 is slightly larger in outer diameter than portions on both sides thereof. Similarly, the second roller 735 includes a large diameter portion 7351 at a center thereof in the longitudical direction, wherein the large diameter portion 7351 is slightly larger in outer diameter than portions on both sides thereof. With this configuration, the large diameter portion 7341 of the first roller 734 and the large diameter portion 7351 of the second roller 735 closely contact each other.

Hereinafter, the portions of the first roller 734 located on both sides of the large diameter portion 7341 are referred to as small diameter portions 7342. Similarly, the portions of the second roller 735 located on both sides of the large diameter portion 7351 are referred to as small diameter portions 7352. As one example, the large diameter portion 7341, 7351 is larger, in radius, by approximately 0.1 mm to 0.5 mm than the small diameter portions 7342, 7352.

It is noted that although not shown, as with the second roller 735, the third roller 736 includes a large diameter portion and small diameter portions. Furthermore, as with a second shaft portion 7350, a shaft portion of the third roller 736 is coupled with a gear. When a power is transmitted to the gear, the third roller 736 is rotated in conjunction with the first roller 734.

The large diameter portion 7341, 7351 and the small diameter portions 7342, 7352 apply a tension that acts from the center towards opposite ends, to the sheet member 9 passing through the first nip portion 7301. As a result, paper wrinkles are less likely to be generated on the sheet member 9 when it passes through the first nip portion 7301.

The first roller 734 includes a first shaft portion 7340, and the second roller 735 includes a second shaft portion 7350, wherein the first shaft portion 7340 and the second shaft portion 7350 are rotation shafts. The first shaft portion 7340 is coupled with a first gear 734g. The second shaft portion 7350 is coupled with a second gear 735g. The first gear 734g and the second gear 735g receive a driving force from a driving source (not shown) via another gear (not shown). This allows the first gear 734g and the second gear 735g to rotate in conjunction with each other.

When the first gear 734g rotates, the first shaft portion 7340 and the first roller 734 rotate. Similarly, when the second gear 735g rotates, the second shaft portion 7350 and the second roller 735 rotate.

In addition, the blade 733 includes a center protruding portion 7331 in a part of a front-end portion of the blade 733 that corresponds to the large diameter portion 7341, 7351 of the first roller 734 and the second roller 735, the center protruding portion 7331 protruding frontward relative to portions on both sides thereof.

In the example shown in FIG. 5, in the part of the front-end portion of the blade 733 that corresponds to the large diameter portion 7341, 7351 of the first roller 734 and the second roller 735, the central portion is the center protruding portion 7331 and the remaining portions are a pair of concave portions 7332. The pair of concave portions 7332 are more concave than end portions of the blade 733 that are located on both sides of the pair of concave portions 7332 in the longitudinal direction.

When the blade 733 is pulled out from the first nip portion 7301, the pair of concave portions 7332 play a role of reducing friction resistance between the blade 733 and the sheet member 9 nipped between the large diameter portions 7341 and 7351.

In the present embodiment, the sheet folding device 73 can execute a two-fold process and a three-fold process, wherein in the two-fold process, the sheet member 9 is folded in two, and in the three-fold process, the sheet member 9 is folded in three. In the following, the two-fold process and the three-fold process are described with reference to FIG. 6 and FIG. 7.

[Two-Fold Process]

The sheet folding device 73 includes a movable sheet-guiding portion 737 configured to guide the traveling direction of a sheet member 9 fed out from the first nip portion 7301 toward the downstream. The movable sheet-guiding portion 737 is movably supported by a displacement mechanism (not shown).

Figure 6:
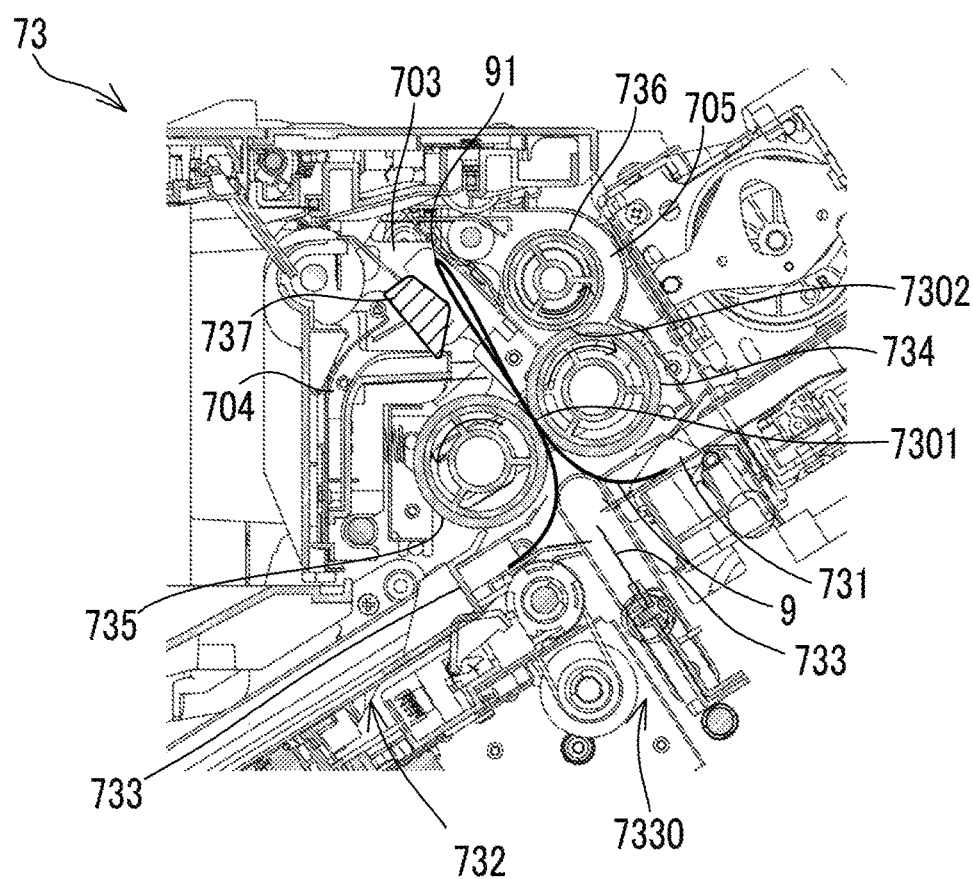
FIG. 6 is a cross-sectional view of the sheet folding device during a two-fold process.

As shown in FIG. 6, in the two-fold process, the movable sheet-guiding portion 737 is positioned to a first position. This allows the entrance of the outlet conveyance path 703 to be opened, and the entrance of the dead-end conveyance path 704 to be closed.

The movable sheet-guiding portion 737 at the first position guides the sheet member 9 fed out from the first nip portion 7301 to the outlet conveyance path 703. This allows the sheet member 9 folded in two by the first roller 734 and the second roller 735 to be discharged to the second discharge tray 708 from the outlet conveyance path 703.

[Three-Fold Process]

Figure 7:
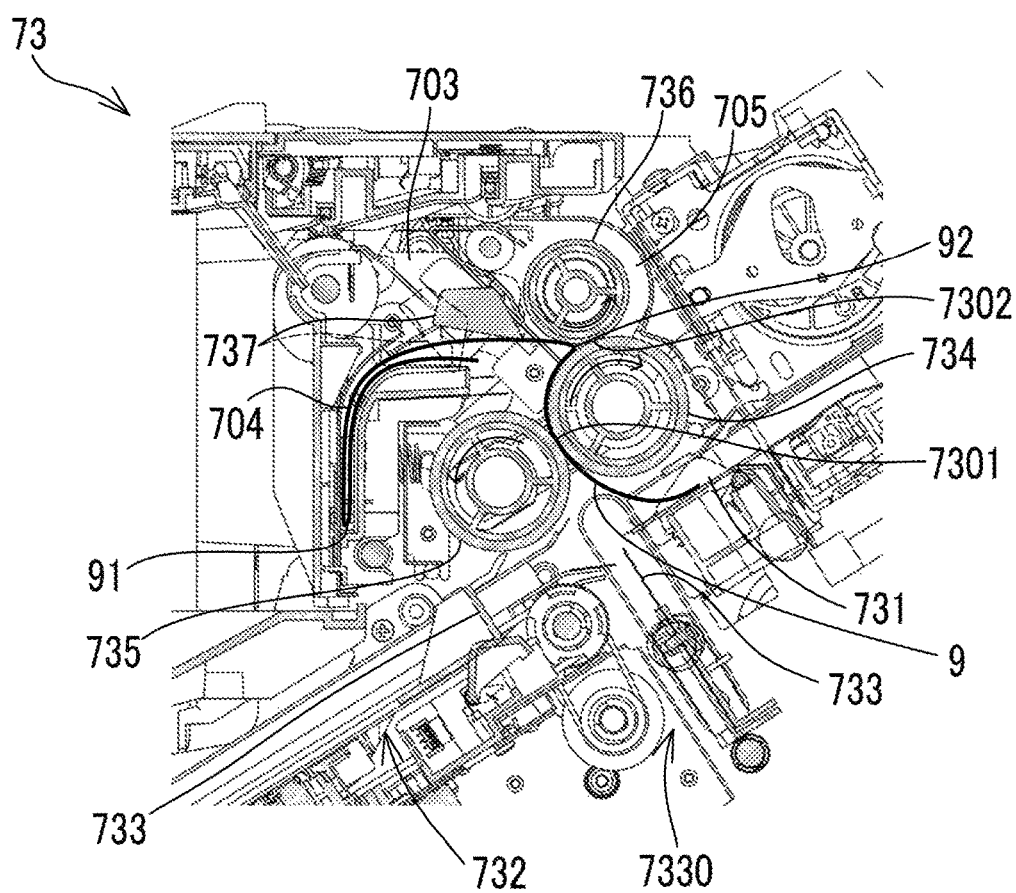
FIG. 7 is a cross-sectional view of the sheet folding device during a three-fold process.

As shown in FIG. 7, in the three-fold process, the movable sheet-guiding portion 737 is positioned to a second position. This allows the entrance of the outlet conveyance path 703 to be closed, and the entrance of the dead-end conveyance path 704 to be opened.

The movable sheet-guiding portion 737 at the second position guides the sheet member 9 fed out from the first nip portion 7301 to the dead-end conveyance path 704. This allows the sheet member 9 that has been folded in two to enter the dead-end conveyance path 704, with a first folding line 91 formed by the first nip portion 7301 in front.

The dead-end conveyance path 704 is provided on an opposite side of the second roller 735 with respect to the blade 733, and forms a dead-end path for the sheet member 9.

First, the movable sheet-guiding portion 737 guides a part of the sheet member 9 that has passed through the first nip portion 7301, to the dead-end conveyance path 704. This allows the sheet member 9 folded in two to be conveyed along the dead-end conveyance path 704 until the first folding line 91 reaches the innermost part of the dead-end conveyance path 704.

Next, as shown in FIG. 7, after the first folding line 91 reaches the innermost part of the dead-end conveyance path 704, the movable sheet-guiding portion 737 guides the remaining part of the sheet member 9 that has passed through the first nip portion 7301, to the second nip portion 7302. It is noted that the movable sheet-guiding portion 737 is an example of the sheet guiding portion of the present disclosure.

The sheet member 9 guided to the second nip portion 7302 is nipped by the first roller 734 and the third roller 736. The sheet member 9 is passed through the second nip portion 7302 while being nipped by the first roller 734 and the third roller 736, and is fed out from the second nip portion 7302 toward the downstream. This allows the first roller 734 and the third roller 736 to form, on the sheet member 9, a second folding line 92 that is different from the first folding line 91.

The bypass conveyance path 705 is a conveyance path that extends from the downstream of the second nip portion 7302 and merges with the middle of the outlet conveyance path 703. The sheet member 9, after being fed out from the second nip portion 7302, enters the bypass conveyance path 705.

The sheet member 9 that has entered the bypass conveyance path 705 is conveyed along the bypass conveyance path 705 and enters the middle of the outlet conveyance path 703 and then discharged to the second discharge tray 708 by the conveyance roller 70. This allows the sheet member 9 folded in three to be discharged to the second discharge tray 708.

The movable sheet supporting portion 732 sets the position of the lower end supporting portion 7320 based on the size of the sheet member 9 and sets which of the two-fold process or the three-fold process is performed on the sheet member 9.

The entrance of the outlet conveyance path 703 is approximately located on a line extending from the front end of the blade 733. On the other hand, the entrance of the dead-end conveyance path 704 is more on the second roller 735 side than the line extending from the front end of the blade 733. In addition, the first roller 734 rotates at a peripheral speed slightly higher than that of the second roller 735.

In the present embodiment, the gear ratios of the first gear 734g and the second gear 735g to the gear (not shown) of the driving side are the same. As a result, the rotation speeds of the first roller 734 and the second roller 735 are the same. In addition, the first roller 734 is slightly larger than the second roller 735 in diameter. This enables the first roller 734 to rotate at a peripheral speed slightly higher than that of the second roller 735.

A ratio between the peripheral speed of the first roller 734 and the peripheral speed of the second roller 735 is set such that the sheet member 9 fed out from the first nip portion 7301 moves toward the middle of the entrance of the outlet conveyance path 703 and the entrance of the dead-end conveyance path 704. This facilitates the movable sheet-guiding portion 737 to guide the sheet member 9 either to the outlet conveyance path 703 or to the dead-end conveyance path 704.

Meanwhile, a gear coupling mechanism including a parallel pin may be adopted as a mechanism for coupling the first gear 734g and the second gear 735g with the first shaft portion 7340 and the second shaft portion 7350 of the first roller 734 and the second roller 735 for the sheet folding process, respectively.

Figure 8:
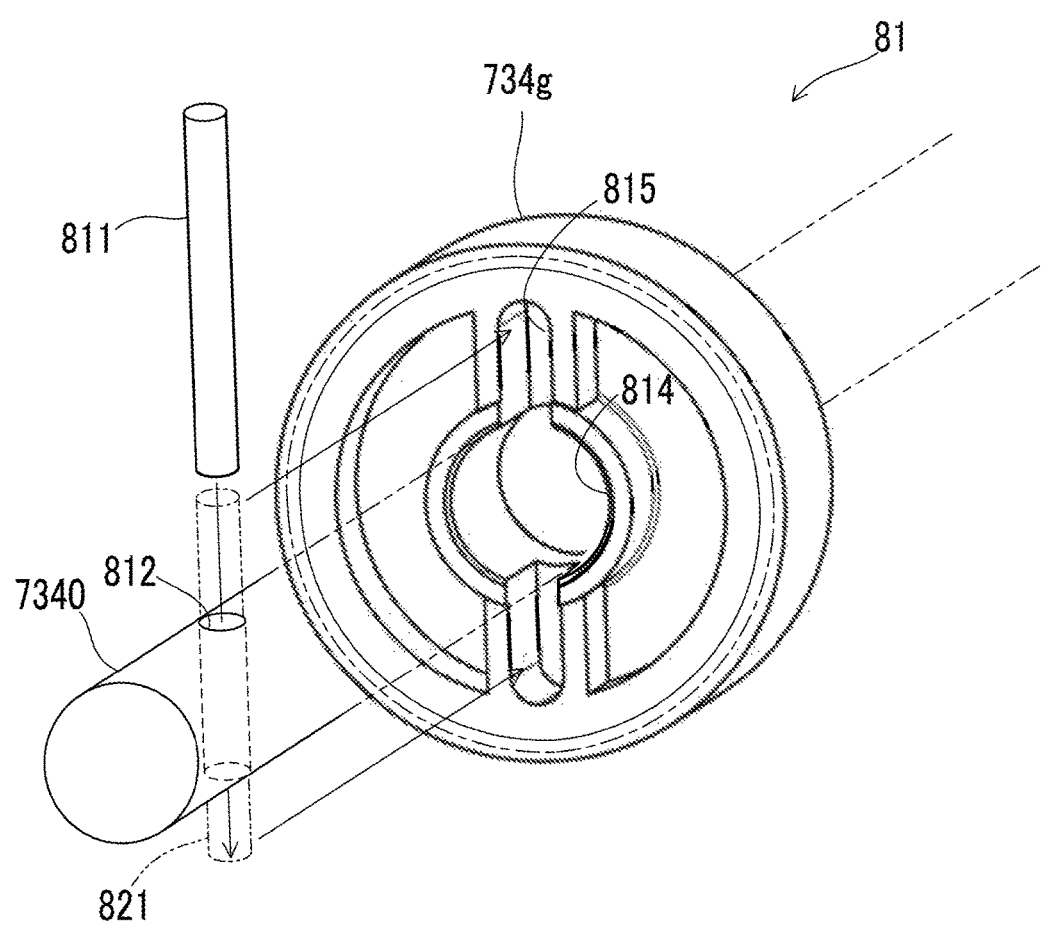
FIG. 8 is a disassembled perspective view of a first gear coupling mechanism in the sheet folding device.
Figure 9:
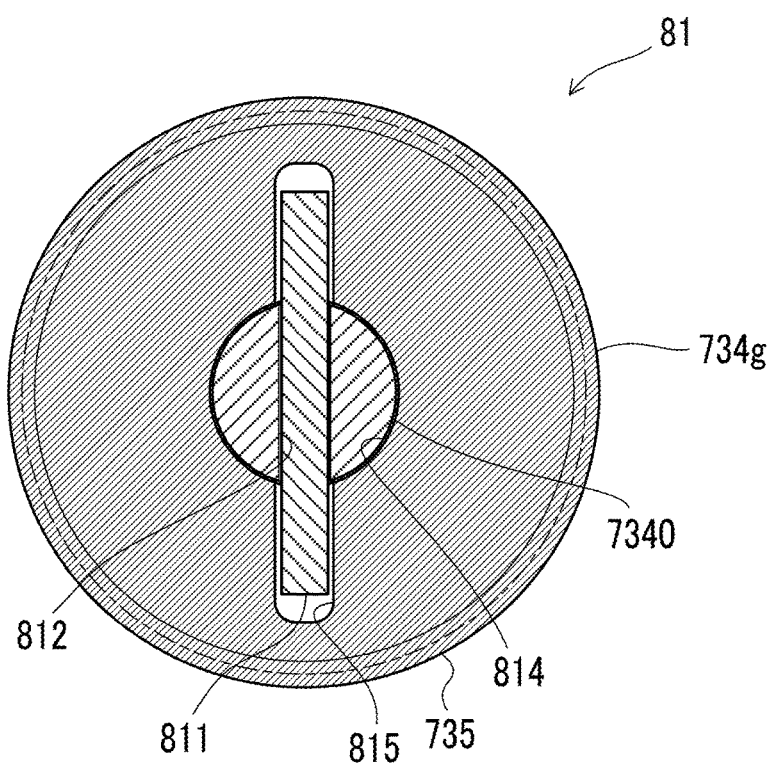
FIG. 9 is a cross-sectional view of the first gear coupling mechanism in the sheet folding device.

More specifically, a first gear coupling mechanism 81 as shown in FIG. 8 and FIG. 9 may be adopted as a mechanism for coupling the first gear 734*g* with the first shaft portion 7340 of the first roller 734.

The first gear coupling mechanism 81 includes a first parallel pin 811, a first pin through-hole 812 formed in the first shaft portion 7340, and a first shaft through-hole 814 and a first groove 815 formed in the first gear 734*g*. The first pin through-hole 812 is a through hole extending in a direction perpendicular to the longitudinal direction of the first shaft portion 7340. In addition, the first shaft through-hole 814 is a through hole that extends along the rotation center line of the first gear 734*g*.

The first parallel pin 811 made of metal is passed through the first pin through-hole 812 of the first shaft portion 7340 and is inserted in the first groove 815 formed in the first gear 734*g* that is made of synthetic resin. In this case, a small gap is generated between the first parallel pin 811 and the inner side surface of the first pin through-hole 812 of the first shaft portion 7340, and a small gap is also generated between the first parallel pin 811 and the inner side surface of the first groove 815 of the first gear 734*g*. These gaps become plays for transmission of a rotative force from the first gear 734*g* to the first roller 734.

In the case where the configuration of the first gear coupling mechanism 81 is adopted also as a mechanism for coupling the second gear 735*g* with the second shaft portion 7350 of the second roller 735, a trouble occurs that paper wrinkles are likely to be generated on the sheet member 9, as described in the following.

Figure 13:
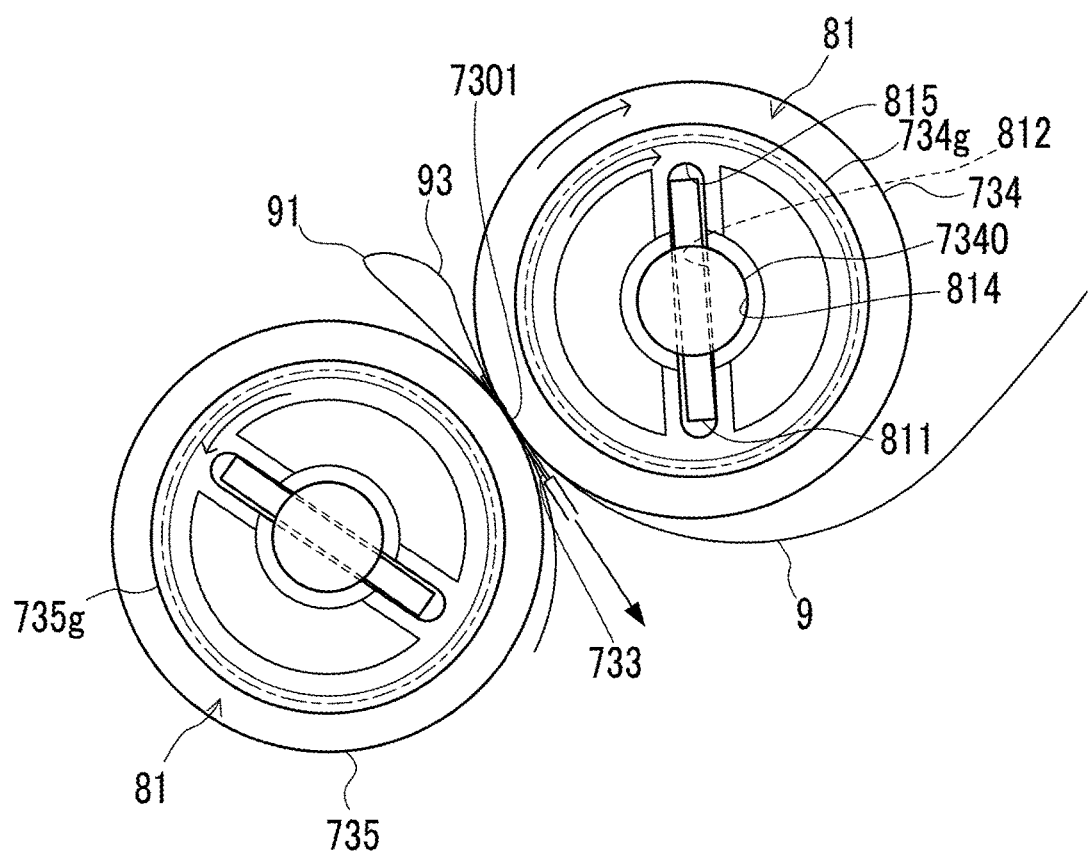
FIG. 13 is a diagram showing the pair of rollers and the blade of the conventional sheet folding device in the state immediately before the blade is pulled out from the nip portion.

That is, when the first roller 734 and the second roller 735 have different peripheral speeds, looseness 93 is likely to be generated on a part of the sheet member 9 that has passed through the first nip portion 7301, due to a play of the first gear coupling mechanism 81 including the first parallel pin 811 (see FIG. 13).

More specifically, among portions of the sheet member 9 folded in two, the looseness 93 is likely to be generated in a portion on the side of the first roller 734 that has a higher peripheral speed. The looseness 93 becomes a cause of the paper wrinkles that are generated when the blade 733 is pulled out from the first nip portion 7301.

Figure 12:
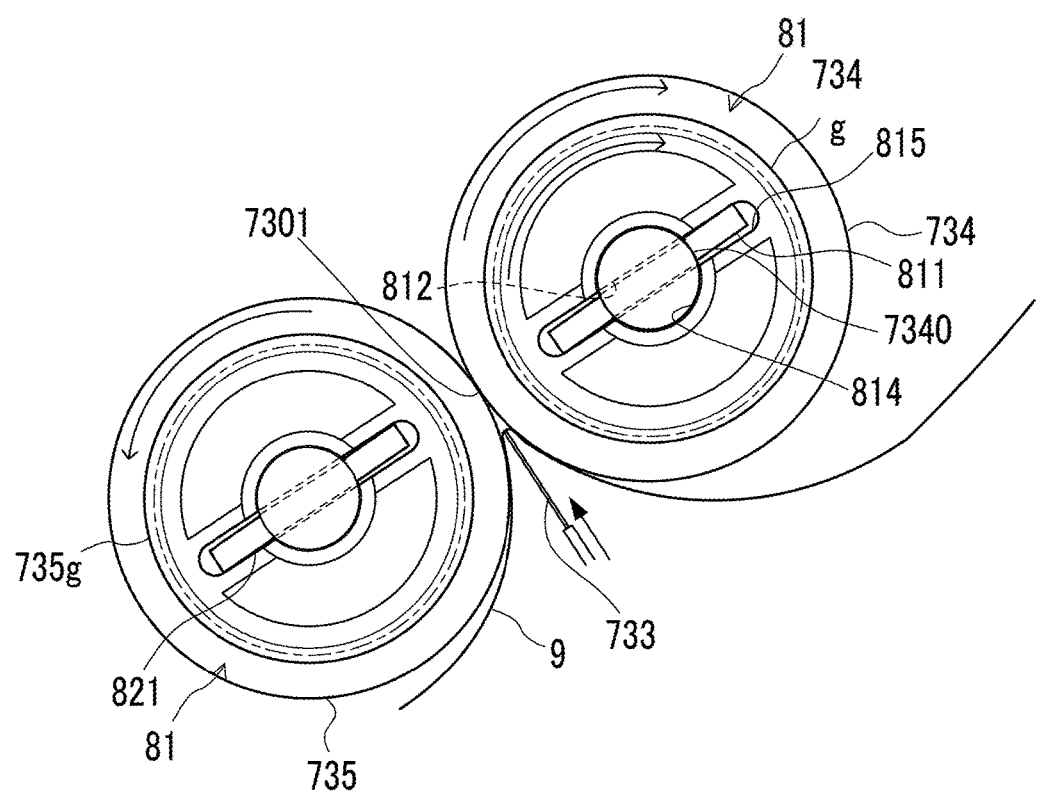
FIG. 12 is a diagram showing a pair of rollers and a blade of a conventional sheet folding device in the state before the blade is inserted in a nip portion.

FIG. 12 and FIG. 13 are diagrams showing a pair of rollers 734 and 735 and the blade 733 included in a conventional sheet folding device. In the conventional sheet folding device, the first gear coupling mechanism 81 is adopted both as a mechanism for coupling the first gear 734*g* with the first shaft portion 7340 of the first roller 734, and as a mechanism for coupling the second gear 735*g* with the second shaft portion 7350 of the second roller 735.

FIG. 12 shows a state before the blade 733 is inserted in the first nip portion 7301. FIG. 13 shows a state immediately before the blade 733 is pulled out from the first nip portion 7301.

As shown in FIG. 12 and FIG. 13, in the first roller 734 having a higher peripheral speed, the first gear 734*g* always rotates prior to the first shaft portion 7340. On the other hand, in the second roller 735 having a lower peripheral speed, the second gear 735*g* may or may not rotate prior to the second shaft portion 7350.

For example, as shown in FIG. 12, in the state before the blade 733 is inserted in the first nip portion 7301, since the second roller 735 rotates together with the first roller 734, the second shaft portion 7350 rotates prior to the second gear 735*g*.

On the other hand, in the state where the sheet member 9 and the blade 733 are inserted in the first nip portion 7301, power is not transmitted to the outer circumferential surface of the second roller 735 from the outer circumferential surface of the first roller 734. As a result, the second gear 735*g* idles due to the play of the first gear coupling mechanism 81, and during the idling period, the rotation of the second roller 735 temporarily stops. As a result, as shown in FIG. 13, the looseness 93 is generated in the sheet member 9.

If the blade 733 is pulled out from the first nip portion 7301 in the state where the looseness 93 is generated in the sheet member 9, paper wrinkles are likely to be generated on a portion of the sheet member 9 that has been in contact with the blade 733. In particular, paper wrinkles are likely to be generated on a portion of the sheet member 9 that has been in contact with the center protruding portion 7331 of the blade 733.

In the sheet folding device 73 of the present embodiment, a second gear coupling mechanism 82 described below couples the second gear 735*g* with the second shaft portion 7350 of the second roller 735. This configuration prevents paper wrinkles from being generated on a sheet member 9 due to a play of the mechanism that couples the gear 734*g*, 735*g* with the shaft portion 7340, 7350 of the pair of rollers 734, 735 for folding the sheet member 9.

Figure 10:
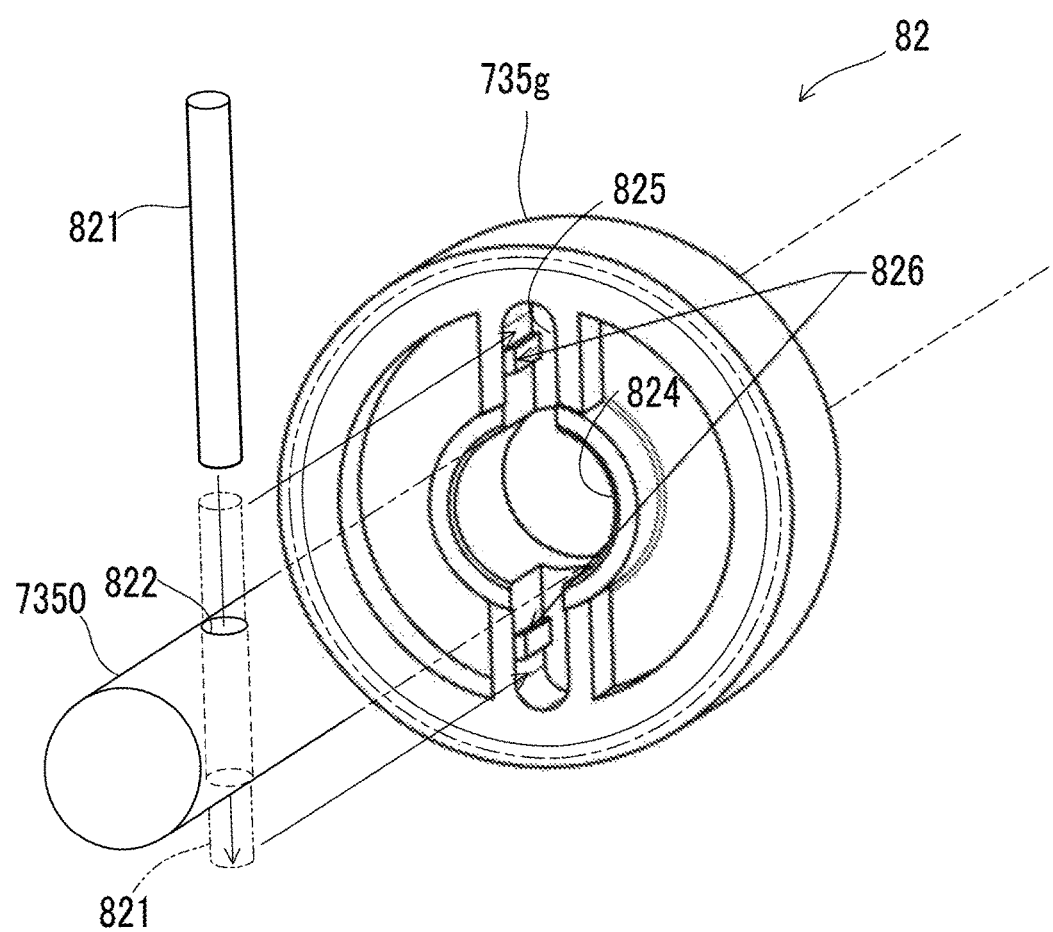
FIG. 10 is a disassembled perspective view of a second gear coupling mechanism in the sheet folding device.
Figure 11:
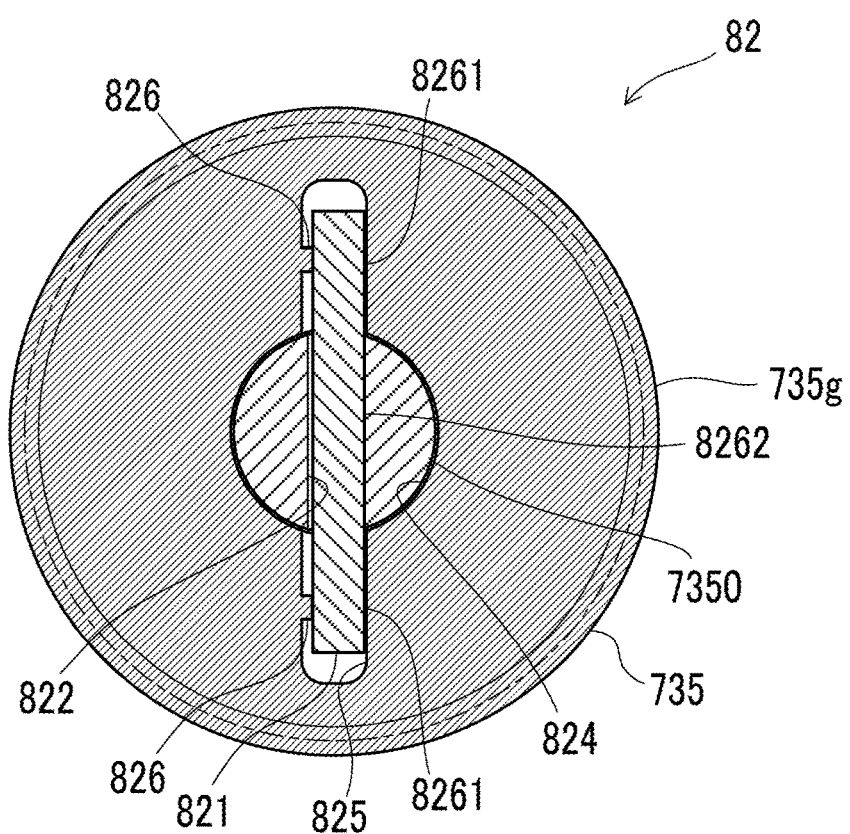
FIG. 11 is a cross-sectional view of the second gear coupling mechanism in the sheet folding device.

FIG. 10 is a disassembled perspective view of the second gear coupling mechanism 82. FIG. 11 is a cross-sectional view of the second gear coupling mechanism 82.

Similar to the first gear coupling mechanism 81, the second gear coupling mechanism 82 includes a second parallel pin 821, a second pin through-hole 822 formed in the second shaft portion 7350, and a second shaft through-hole 824 and a second groove 825 formed in the second gear 735*g*. The second pin through-hole 822 extends in a direction perpendicular to the longitudinal direction of the second shaft portion 7350. In addition, the second shaft through-hole 824 extends along the rotation center line of the second gear 735*g*.

In the second gear coupling mechanism 82, projection portions 826 are formed on a side wall which is one of opposite inner side walls of the second groove 825, such that top parts of the projection portions 826 can closely contact the second parallel pin 821. This is a different point from the first gear coupling mechanism 81. In the present embodiment, two projection portions 826 are respectively formed on both sides of the second shaft through-hole 824 in the second groove 825. That is, the projection portions 826 provided on one inner side wall of the second groove 825, project from both sides of the second shaft portion 7350 toward the second parallel pin 821. The top parts of the projection portions 826 located on both sides of the second shaft portion 7350 closely contact the second parallel pin 821 from the same direction. That is, parallel forces act, in the same direction, on the second parallel pin 821 from the projection portions 826. In the example shown in FIG. 10, the projection portions 826 are ribs formed along the depth direction of the second groove 825.

The second parallel pin 821 made of metal is passed through the second pin through-hole 822 of the second shaft portion 7350 and is inserted in the second groove 825 formed in the second gear 735*g* that is made of synthetic resin. As shown in FIG. 11, the projection portions 826 cause the second parallel pin 821 to closely contact a side wall that is, in the second groove 825, opposite to the side wall on which the projection portions 826 are formed, and cause the second parallel pin 821 to closely contact a portion of the second pin through-hole 822 of the second shaft portion 7350 that is on an opposite side with respect to the projection portions 826.

As shown in FIG. 11, first areas 8261 are areas at which the outer circumferential surface of the second parallel pin 821 closely contacts the inner side wall of the second groove 825. In addition, a second area 8262 is an area at which the outer circumferential surface of the second parallel pin 821 closely contacts the inner surface of the second pin through-hole 822.

When the second parallel pin 821 is inserted in the second groove 825, the projection portions 826 made of synthetic resin slightly contract due to a pressure from the second parallel pin 821. This allows the top parts of the projection portions 826 to closely contact the outer circumferential surface of the second parallel pin 821, and further allows the close contact state in the first areas 8261 and the second area 8262 to be maintained.

According to the present embodiment, by the action of the projection portions 826, the play for the transmission of a rotative force from the second gear 735g to the second roller 735 can be eliminated. In this case, in the sheet member 9 folded in two by the first nip portion 7301, the looseness 93 is not generated in a portion on the side of the first roller 734 having a higher peripheral speed. This makes it possible to prevent paper wrinkles from being generated on the sheet member 9 when the blade 733 is pulled out from the first nip portion 7301.

In addition, the projection portions 826 have a simple configuration, and it is easy to form the projection portions 826 on the second gear 735g made of synthetic resin.

In addition, in the first gear coupling mechanism 81, the first parallel pin 811 is inserted in the first groove 815 of the first gear 734g with a play therebetween. Furthermore, the first parallel pin 811 is inserted in the first pin through-hole 812 of the first shaft portion 7340 with a play therebetween.

As described above, in the first roller 734 having a higher peripheral speed, if the first gear coupling mechanism 81 has a play, the play itself does not become a cause of the looseness 93 or paper wrinkles of the sheet member 9. Rather, the play of the first gear coupling mechanism 81 is convenient for removing a paper jam of the sheet member 9 in the first nip portion 7301, for example.

In addition, in the sheet folding device 73 that can execute the three-fold process, the sheet member 9 that has passed through the first nip portion 7301 needs to be guided to the dead-end conveyance path 704 that is closer to the second roller 735. As a result, it is necessary to set the peripheral speed of the first roller 734 to be higher than the peripheral speed of the second roller 735. In such a case, the effect produced by the second gear coupling mechanism 82 of preventing paper wrinkles from being generated on the sheet member 9 becomes more evident.

Application Examples

In the second gear coupling mechanism 82 shown in FIG. 10 and FIG. 11, a plurality of projection portions 826 may be provided on each of both sides of the second shaft through-hole 824 in the second groove 825.

In the sheet folding device 73, the gear ratios of the first gear 734g and the second gear 735g to the gear (not shown) of the driving side may be different. This enables the peripheral speed of the first roller 734 to be higher than the peripheral speed of the second roller 735 even when the first roller 734 and the second roller 735 have the same outer diameter.

In the sheet folding device 73, the third roller 736 may be formed as a cylinder of uniform diameter, without the large diameter portion and the small diameter portions.

It is noted that the sheet folding device, the post-processing device, the image forming apparatus, and the gear coupling mechanism of the present disclosure may be configured by, within the scope of claims, freely combining the above-described embodiments and application examples, or by modifying the embodiment and application examples or omitting a part thereof.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A sheet folding device comprising:
    a first roller and a second roller configured to rotate in a state where outer circumferential surfaces thereof contact each other;
    a plate-like blade configured to strike a sheet member toward a nip portion between the first roller and the second roller;
    a first parallel pin passed through a first pin through-hole that penetrates through a first shaft portion in a direction perpendicular to a longitudinal direction of the first shaft portion, the first shaft portion being a rotation shaft of the first roller;
    a first gear having a first shaft through-hole and a first groove, the first shaft portion being passed through the first shaft through-hole, the first parallel pin passed through the first shaft portion being inserted in the first groove;
    a second parallel pin passed through a second pin through-hole that penetrates through a second shaft portion in a direction perpendicular to a longitudinal direction of the second shaft portion, the second shaft portion being a rotation shaft of the second roller; and
    a second gear having a second shaft through-hole and a second groove, the second shaft portion being passed through the second shaft through-hole, the second parallel pin passed through the second shaft portion being inserted in the second groove, wherein
    the blade strikes the sheet member such that the sheet member is folded in two and inserted in the nip portion,
    the first gear and the second gear rotate in conjunction with each other,
    the first roller rotates at a higher peripheral speed than the second roller,
    projection portions are formed on a side wall which is one of opposite inner side walls of the second groove, in such a way as to project from both sides of the second shaft portion toward the second parallel pin, and
    the projection portions cause the second parallel pin to closely contact a side wall that is, in the second groove, opposite to the side wall on which the projection portions are formed, and cause the second parallel pin to closely contact a portion of the second pin through-hole that is on an opposite side with respect to the projection portions.
2. The sheet folding device according to claim 1, wherein the first parallel pin is inserted in the first groove with a play therebetween.

3. The sheet folding device according to claim 1, wherein
the first roller and the second roller each include a large diameter portion at a center thereof in a longitudical direction, the large diameter portion being slightly larger in outer diameter than portions on both sides thereof, and
the blade includes a protruding portion in a part of a front-end portion of the blade that corresponds to the large diameter portion, the protruding portion protruding frontward relative to portions on both sides thereof.

4. The sheet folding device according to claim 1 further comprising:
a third roller configured to rotate in a state where an outer circumferential surface thereof contacts an outer circumferential surface of the first roller;
a dead-end conveyance path provided on an opposite side of the second roller with respect to the blade, and forming a dead-end path for the sheet member; and
a sheet guiding portion configured to guide a part of the sheet member that has passed through a first nip portion between the first roller and the second roller, to the dead-end conveyance path, and after the sheet member reaches an innermost part of the dead-end conveyance path, guide a remaining part of the sheet member that has passed through the first nip portion, to a second nip portion between the first roller and the third roller, wherein
the first roller and the third roller cause the sheet member to be passed through and fed out from the second nip portion while being nipped by the first roller and the third roller, thereby forming, on the sheet member, a second folding line that is different from a first folding line formed by the first nip portion.

5. An image forming apparatus comprising:
an image forming portion configured to form an image on a sheet member; and
the sheet folding device according to claim 1.

6. A gear coupling mechanism comprising:
a rotation shaft;
a parallel pin passed through a pin through-hole that penetrates through the rotation shaft in a direction perpendicular to a longitudinal direction of the rotation shaft; and
a gear having a shaft through-hole and a groove, the rotation shaft being passed through the shaft through-hole, the parallel pin passed through the rotation shaft being inserted in the groove, wherein
projection portions are formed on a side wall which is one of opposite inner side walls of the groove, in such a way as to project from both sides of the rotation shaft toward the parallel pin, and
the projection portions cause the parallel pin to closely contact a side wall that is, in the groove, opposite to the side wall on which the projection portions are formed, and cause the parallel pin to closely contact a portion of the pin through-hole that is on an opposite side with respect to the projection portions.

* * * * *